US008987993B2

(12) United States Patent
Shoji et al.

(10) Patent No.: US 8,987,993 B2
(45) Date of Patent: Mar. 24, 2015

(54) ORGANIC ELECTROLUMINESCENCE DEVICE

(71) Applicant: Rohm Co., Ltd., Kyoto (JP)

(72) Inventors: Kohei Shoji, Kyoto (JP); Akimasa Maruo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/188,864

(22) Filed: Feb. 25, 2014

(65) Prior Publication Data

US 2014/0239846 A1 Aug. 28, 2014

(30) Foreign Application Priority Data

Feb. 25, 2013 (JP) ................. 2013-034395

(51) Int. Cl.
H05B 33/08 (2006.01)
(52) U.S. Cl.
CPC .................. *H05B 33/0896* (2013.01)
USPC ........................ 315/169.3; 345/76
(58) Field of Classification Search
USPC ............. 315/169.3, 169.1, 169.2; 345/80, 76, 345/78, 77, 79, 82, 84
See application file for complete search history.

(56) References Cited

U.S. PATENT DOCUMENTS

| 8,194,008 B2 * | 6/2012 | Yamazaki et al. ............. 345/76 |
| 2003/0214467 A1 | 11/2003 | Koyama et al. |
| 2009/0237390 A1 | 9/2009 | Koyama et al. |
| 2011/0193924 A1 * | 8/2011 | Nagumo ..................... 347/118 |

FOREIGN PATENT DOCUMENTS

| JP | 2003-330419 | 11/2003 |
| JP | 2005-157009 | 6/2005 |

* cited by examiner

*Primary Examiner* — David H Vu
(74) *Attorney, Agent, or Firm* — Fish & Richardson P.C.

(57) ABSTRACT

An organic EL device comprising: an organic EL element; a first transistor that controls a drive current of the organic EL element in accordance with a brightness adjustment voltage; and a temperature correction circuit that corrects the brightness adjustment voltage in accordance with a temperature; wherein the temperature correction circuit includes: a second transistor that has a same temperature characteristic as the first transistor; a resistor element that is connected to the second transistor; and an operational amplifier that controls the second transistor such that a predetermined reference voltage and a voltage across the resistor element become equal to each other; wherein the temperature correction circuit corrects the brightness adjustment voltage in accordance with an output from the operational amplifier.

10 Claims, 11 Drawing Sheets

ORGANIC ELECTROLUMINESCENCE DEVICE

CROSS-REFERENCE TO RELATED APPLICATIONS

This application is based on Japanese Patent Application No. 2013-034395 filed on Feb. 25, 2013, the contents of which are hereby incorporated by reference.

BACKGROUND OF THE INVENTION

1. Field of the Invention

The present invention relates to an organic EL [electroluminescence] device (organic EL display, organic EL light and the like).

2. Description of Related Art

An organic EL display is composed of mainly a panel portion, a source driver, and a gate driver. The panel portion includes pixel circuits whose number is equal to the number of pixels (the number of effective pixels in a color XGA [extended graphics aray]: 1024 lateral×768 vertical×3 colors). The pixel circuit is composed of a transistor and an organic EL element. The transistor is controlled to flow a desired drive current into the organic EL element, whereby it is possible to make the organic EL element emit light. The drive current flowing in the organic EL element and the brightness of the organic EL element are in a proportional relationship.

In the meantime, as examples of prior art relevant to the above description, there are JP-A-2003-330419 and JP-A-2005-157009.

The transistor included in the pixel circuit has a temperature characteristic and production unevenness, and the drive current flowing in the organic EL element varies under the influence of these; accordingly, it is hard to keep the brightness of the organic EL element constant.

In the meantime, conventionally, a structure is employed, in which various kinds of calculations and the like are performed based on temperature information obtained by a temperature sensor to correct a control voltage of the transistor; whereby the desired drive current is flowed into the organic EL element irrespective of the temperature to keep the brightness of the organic EL element at a desired value.

However, in the above conventional structure, the temperature sensor is necessary and an analog signal obtained by the temperature sensor is converted into a digital signal to perform a complicated logic calculation by means of a data table and the like.

SUMMARY OF THE INVENTION

In light of the above problems found by the inventors of the present application, it is an object of the present invention to provide an organic EL device that is able to perform brightness correction of an organic EL element in accordance with a temperature without requiring a sensor.

To achieve the above object, an organic EL device according to the present invention comprises: an organic EL element; a first transistor that controls a drive current of the organic EL element in accordance with a brightness adjustment voltage; and a temperature correction circuit that corrects the brightness adjustment voltage in accordance with a temperature; wherein the temperature correction circuit includes: a second transistor that has a same temperature characteristic as the first transistor; a resistor element that is connected to the second transistor; and an operational amplifier that controls the second transistor such that a predetermined reference voltage and a voltage across the resistor element become equal to each other; wherein the temperature correction circuit corrects the brightness adjustment voltage in accordance with an output from the operational amplifier.

Other features, elements, steps, advantages and characteristics of the present invention will become more apparent from the following detailed description of preferred embodiments with reference to the relevant attached drawings.

DETAILED DESCRIPTION OF PREFERRED EMBODIMENTS

<Organic EL Display>

Figure 1:
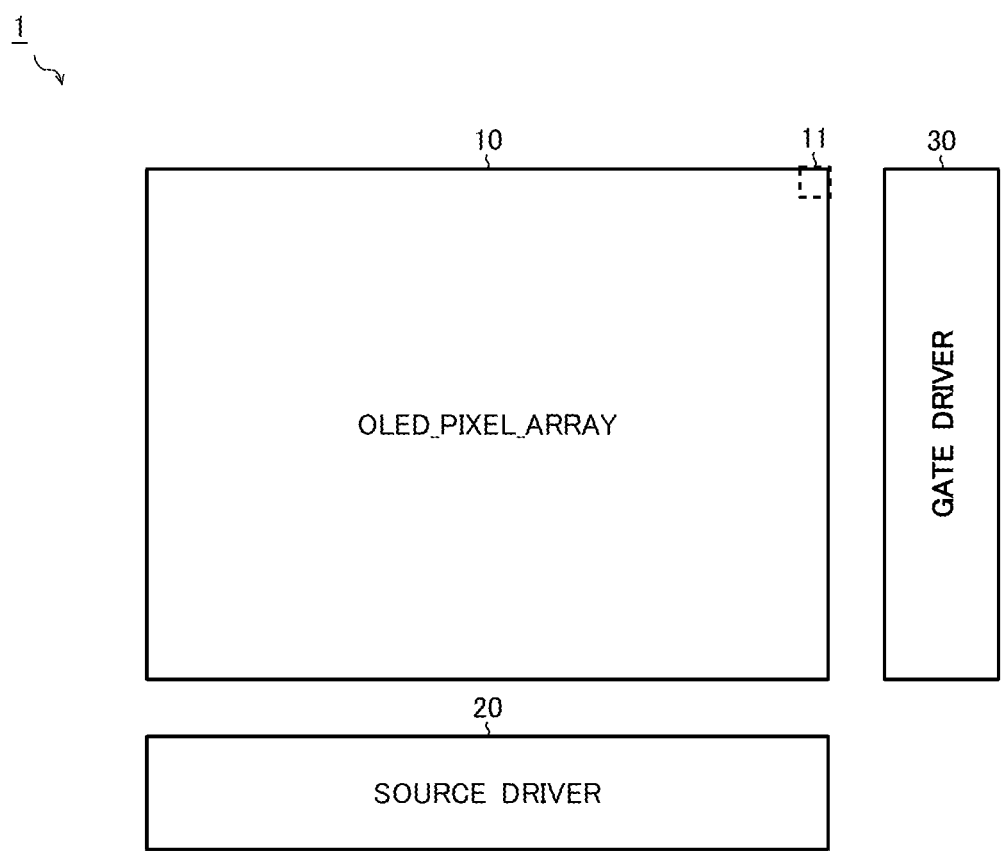
FIG. 1 is a block diagram showing a whole structure of an organic EL display.

FIG. 1 is a block diagram showing a whole structure of an organic EL display. An organic EL display 1 of the present structural example has a panel portion 10, a source driver 20, and a gate driver 30. The panel portion 10 is composed of pixel circuits 11 whose number is equal to the number of pixels (the number of effective pixels in a color XGA: 1024 lateral×768 vertical×3 colors) and which are arranged in an array. The source driver 20 outputs a source voltage VS (brightness adjustment voltage/image signal) to the panel portion 10. The gate driver 30 outputs a gate voltage VG (vertical scan voltage/pixel selection signal) to the panel portion 10.

<Pixel Circuit>

Figure 2:
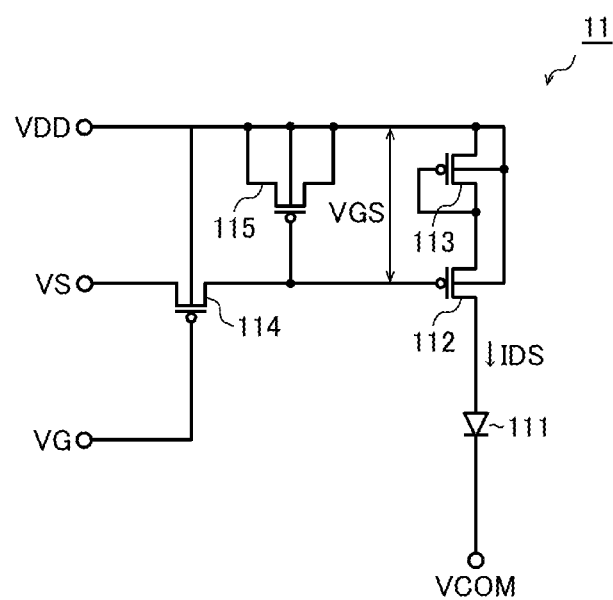
FIG. 2 is a circuit diagram showing a structural example of a pixel circuit.

FIG. 2 is a circuit diagram showing a structural example of the pixel circuit. The pixel circuit 11 of the present structural example includes an organic EL element 111, and a P-channel MOS [metal oxide semiconductor] field effect transistors 112 to 115.

An anode of the organic EL element 111 is connected to a drain of the transistor 112. A cathode of the organic EL element 111 is connected to an application terminal for a common voltage VCOM. A source of the transistor 112 is connected to a drain and gate of the transistor 113. A back gate of the transistor 112, a source and back gate of the transistor 113 are all connected to an application terminal for a power source voltage VDD.

A drain of the transistor 114 is connected to a gate of the transistor 112. A source of the transistor 114 is connected to an application terminal for a source voltage VS. A gate of the transistor 114 is connected to an application terminal for a gate voltage VG. A back gate of the transistor 114 is connected to the application terminal for the power source voltage VDD. The transistor 114 functions as a pixel selection transistor.

A gate of the transistor 115 is connected to the gate of the transistor 112. A source, drain, and back gate of the transistor 115 are all connected to the application terminal for the power source voltage VDD. The transistor 115 functions as a gate capacitor.

In the pixel circuit 11 having the above structure, if the gate voltage VG goes to a low level, the transistor 114 is turned on and the source voltage VS is applied to the gate of the transistor 112. Accordingly, a drive current IDS in accordance with a writing voltage VGS (=VDD−VS) flows from the drain of the transistor 112 into the organic EL element 111. At this time, the organic EL element 111 emits light at a brightness substantially proportional to an electric-current value of the drive current IDS. In the meantime, the higher the source voltage VS is, the lower the writing voltage VGS becomes; accordingly, the drive current IDS becomes small, and the brightness of the organic EL element 111 becomes low. Reversely, the lower the source voltage VS is, the higher the writing voltage VGS becomes; accordingly, the drive current IDS becomes large, and the brightness of the organic EL element 111 becomes high.

Figure 3:
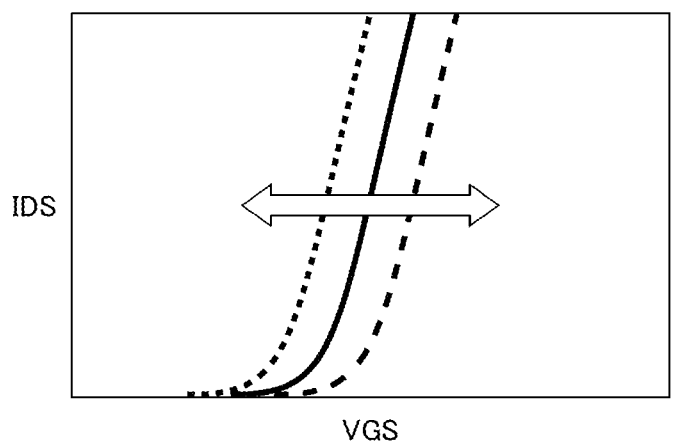
FIG. 3 is a correlation view between a writing voltage VGS and a drive current IDS.

FIG. 3 is a correlation view between the writing voltage VGS and the drive current IDS. In the pixel circuit 11, the transistor 112 for generating the drive current IDS has a temperature characteristic and production unevenness, and the drive current IDS flowing in the organic EL element 111 also varies under the influence of these (see a large arrow in the figure). Specifically describing, the higher the temperature is, the larger the drive current IDS becomes, while the lower the temperature is, the smaller the drive current IDS becomes.

Figure 4:
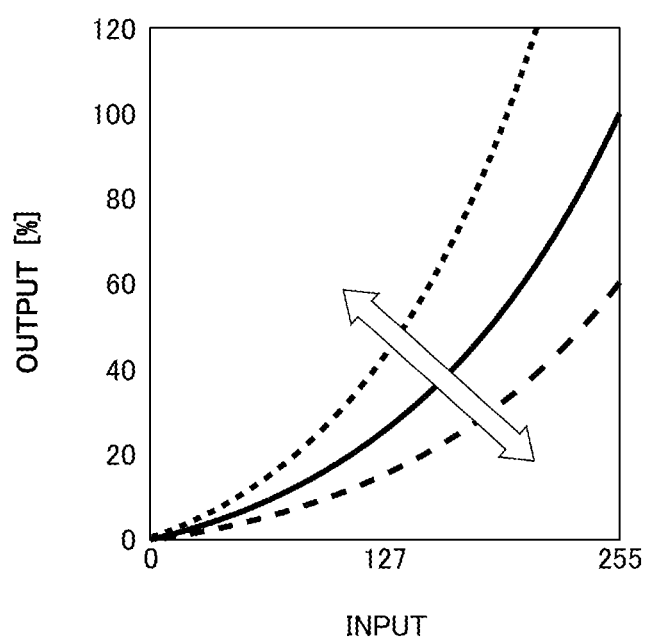
FIG. 4 is an input/output characteristic view of a pixel circuit 11.

FIG. 4 is an input/output characteristic view of the pixel circuit 11. If the drive current IDS varies under the influence of the temperature characteristic and production unevenness of the transistor 112, the input/output characteristic of the pixel circuit 11 changes; accordingly, large brightness unevenness occurs (see a large arrow in the figure). Specifically describing, the higher the temperature is, the higher the brightness becomes, while the lower the temperature is, the lower the brightness becomes.

Because of this, the organic EL display 1 of the present structural example is provided with a temperature correction circuit 40 that corrects the source voltage VS (which corresponds to the brightness adjustment voltage) in accordance with the temperature. Hereinafter, a structure and operation of the temperature correction circuit 40 are described in detail.

<Temperature Correction Circuit>

Figure 5:
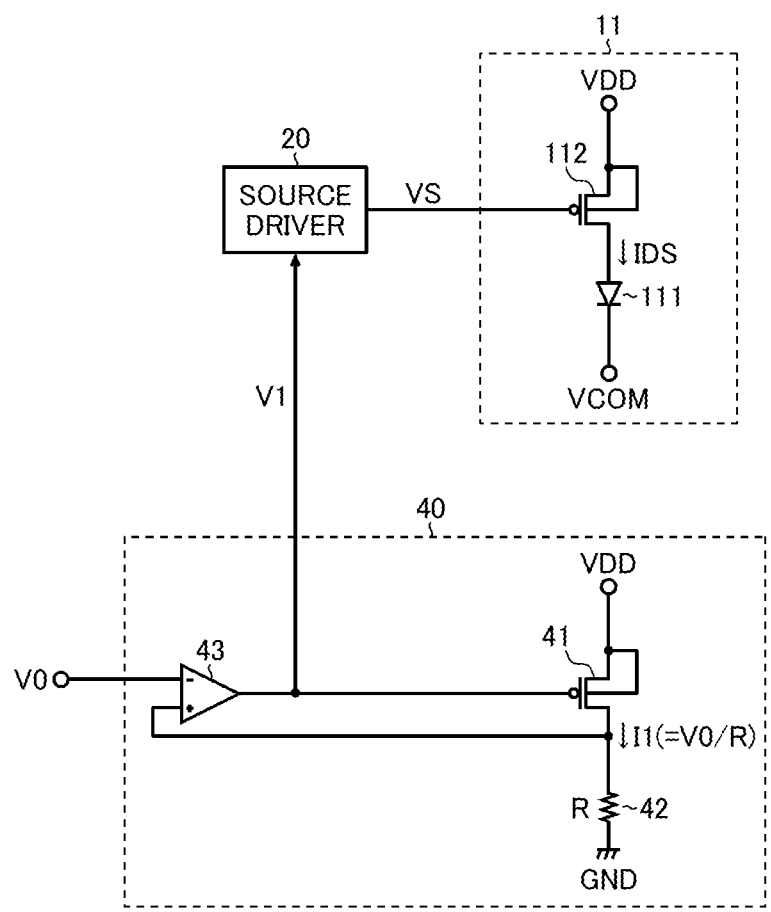
FIG. 5 is a circuit diagram showing a first structural example of a temperature correction circuit 40.

FIG. 5 is a circuit diagram showing a first structural example (structure showing a basic concept) of the temperature correction circuit 40. The temperature correction circuit 40 of the first structural example includes a P-channel MOS field effect transistor 41, a resistor element 42 (resistance value: R), and an operational amplifier 43. A source and back gate of the transistor 41 are connected to the application terminal for the power source voltage VDD. A drain of the transistor 41 is connected to a first terminal of the resistor element 42. A second terminal of the resistor element 42 is connected to a ground terminal. An inverting input terminal (−) of the operational amplifier 43 is connected to an application terminal for a reference voltage V0 (e.g., a band gap reference voltage whose temperature characteristic is flat). A non-inverting input terminal (+) of the operational amplifier 43 is connected to the first terminal of the resistor element 42.

In the meantime, as the resistor element, it is desirable to use a polysilicon resistor whose temperature characteristic is nearly flat. An output terminal of the operational amplifier 43 is connected to a gate of the transistor 41, and also, as an output terminal for a temperature correction voltage V1, connected to the source driver 20.

In the meantime, the transistor 41 is formed in the same process as the transistor 112 (which corresponds to a first transistor that controls the drive current IDS of the organic EL element 111 in accordance with the source voltage VS) included in the pixel circuit 11, and corresponds to a second transistor that has the same temperature characteristic and production unevenness as the transistor 112.

The operational amplifier 43 performs gate control of the transistor 41 such that the reference voltage V0 and the voltage across the resistor element 42 become equal to each other. Accordingly, a constant current I1 (=V0/R), which does not depend on the temperature, flows in the resistor element 42. On the other hand, the transistor 41 has the same temperature characteristic as the transistor 112. Accordingly, the temperature correction voltage V1, which is applied from the operational amplifier 43 to the gate of the transistor 41, varies in accordance with the temperature. Specifically describing, the higher the temperature is, the higher the temperature correction voltage V1 becomes, while the lower the temperature is, the lower the temperature correction voltage V1 becomes.

The source driver 20 heightens the source voltage VS as the temperature correction voltage V1 becomes higher, and lowers the source voltage VS as the temperature correction voltage V1 becomes lower. In other words, a feedback is performed to lower the brightness of the organic EL element 111 as the temperature becomes higher, reversely, a feedback is performed to raise the brightness of the organic EL element 111 as the temperature becomes lower.

As described above, according to the structure in which the source voltage VS is corrected in accordance with an output from the operational amplifier 43, it is possible to perform the brightness correction of the organic EL element 111 in accordance with the temperature without using a sensor; accordingly, it becomes unnecessary to perform analog/digital conversion of a sensor signal and a complicated logic calculation.

Figure 6:
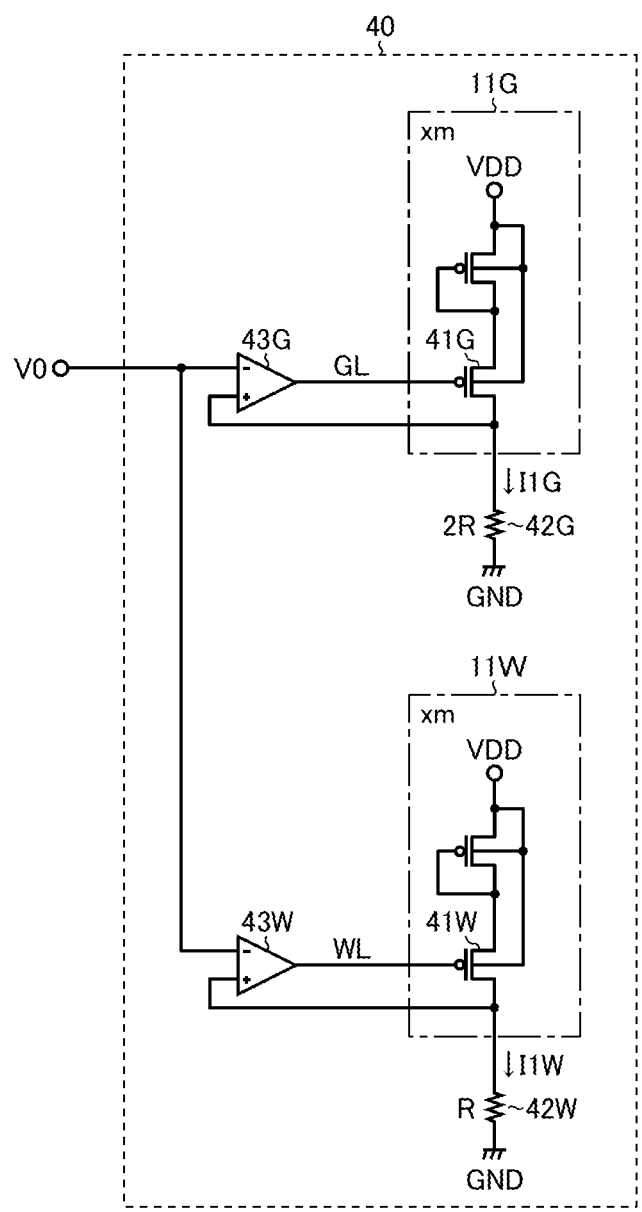
FIG. 6 is a circuit diagram showing a second structural example of the temperature correction circuit 40.

FIG. 6 is a circuit diagram showing a second structural example of the temperature correction circuit 40. The temperature correction circuit 40 of the second structural example has basically the same structure of the above first structural example (FIG. 5); however, proposes a more specific structure than the first structural example in that a dummy pixel circuit of the panel portion 10 is used; and two sets of the resistor element 42 and operational amplifier 43 are used to decide a white level and a grey level. Hereinafter, detailed description is performed focusing on a feature portion of the second structural example.

To solve the production unevenness of the pixel circuit 11 (difference between a central portion of the panel portion 10 and a peripheral portion of the panel portion 10), the panel portion 10 includes dummy pixel circuits formed in the same pattern as the pixel circuits 11 to surround the plurality of pixel circuits 11 that are arranged in the array (see FIG. 8 describe later). These dummy pixel circuits are not connected to the organic EL element 111 and are not used for a display operation.

Because of this, a structure is employed, in which the temperature correction circuit 40 of the second structural example connects at least one of the plurality of dummy pixel circuits to the resistor element 42 and operational amplifier 43, thereby using a transistor included in the dummy pixel circuit as the above transistor 41. By employing such a structure, it is possible to effectively use the dummy pixel circuit of the panel portion 10 as a part of the temperature correction circuit 40, which does not incur an unnecessarily large chip area when mounting the temperature correction circuit 40.

Besides, the temperature correction circuit 40 of the second structural example has a structure which uses the two sets of the resistor element 42 and operational amplifier 43 to decide a white level WL during a panel all turned-on time and a grey level GL during a panel half turned-on time (half-brightness time); further decides a black level BL during a panel all turned-off time based on the white level WL and the grey level GL. Hereinafter, this point is described in detail.

A total of m dummy pixel circuits 11W are connected to a resistor element 42W (resistance value: R), and gates of transistors 41W included in the respective dummy pixel circuits 11W are all connected to an output terminal of an operational amplifier 43W. The operational amplifier 43W performs gate control of the transistor 41W such that the reference voltage V0 and the voltage across the resistor element 42W become equal to each other. Accordingly, a constant current I1W (=V0/R), which does not depend on the temperature, flows in the resistor element 42W.

On the other hand, a total of m dummy pixel circuits 11G are connected to a resistor element 42G (resistance value: 2R), and gates of transistors 41G included in the respective dummy pixel circuits 11G are all connected to an output terminal of an operational amplifier 43G. The operational amplifier 43G performs gate control of the transistor 41G such that the reference voltage V0 and the voltage across the resistor element 42G become equal to each other. Accordingly, a constant current I1G (=V0/2R), which does not depend on the temperature, flows in the resistor element 42G.

As described above, the constant current I1G flowing in the resistor element 42G is designed to be ½ of the constant current I1W flowing in the resistor element 42W. Accordingly, when an output from the operational amplifier 43W is the white level WL, an output from the operational amplifier 43G becomes the grey level. In the meantime, the higher the temperature is, the higher the white level WL and the grey level GL become, while the lower the temperature is, the lower the white level WL and the grey level GL become.

Figure 7:
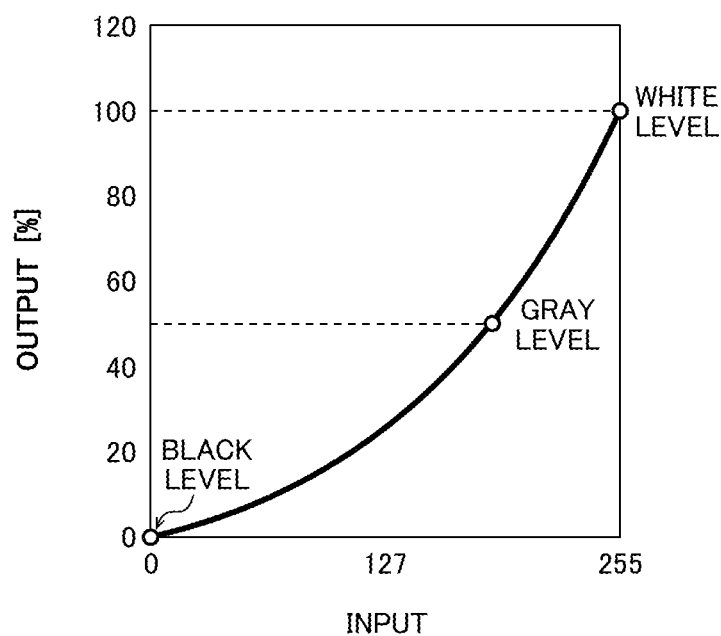
FIG. 7 is a view of an input/output characteristic required for the pixel circuit 11.

FIG. 7 is a view of an input/output characteristic required for the pixel circuit 11. In the organic EL display 1, it is required to keep the input/output characteristic of FIG. 7 irrespective of the temperature and the production unevenness. According to the temperature correction circuit 40 of the second structural example, it is possible to correct the white level WL and the grey level GL in accordance with the temperature; accordingly, if it is possible to correct the black level BL in accordance with the temperature, it becomes possible to keep the input/output characteristic of FIG. 7.

It is possible to obtain an approximate value of the black level BL by means of a calculation formula, BL=(GL−WL)×α+WL. Accordingly, if it is possible to decide the white level WL and the grey level GL, it becomes possible to uniquely decide the black level BL as well.

As described above, according to the temperature correction circuit 40 of the second structural example, it is possible to keep the input/output characteristic of FIG. 7 irrespective of the temperature and the production unevenness; accordingly, it becomes possible to dramatically reduce the brightness unevenness of the panel portion 10.

Figure 8:
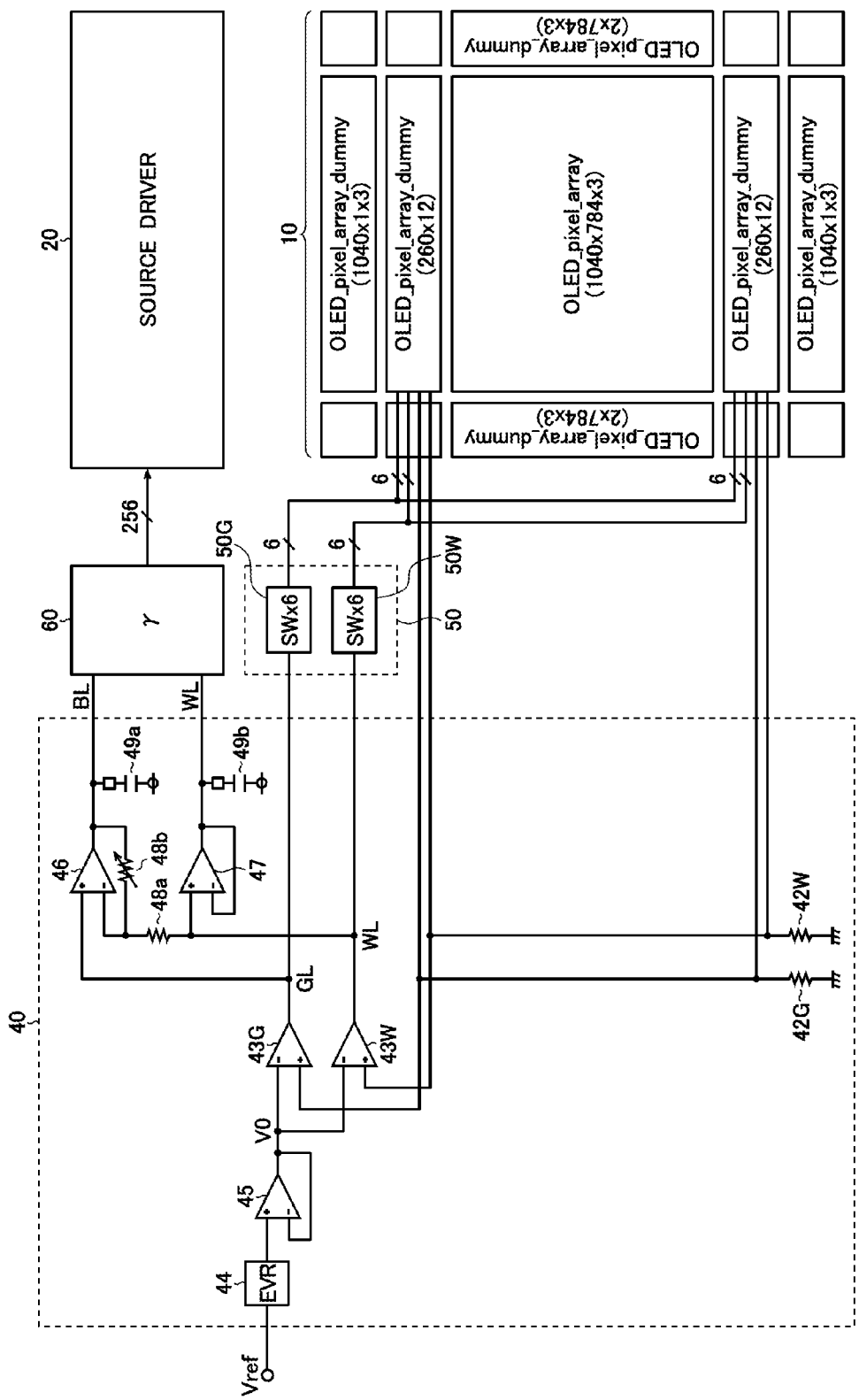
FIG. 8 is a circuit diagram showing a third structural example of the temperature correction circuit 40.

FIG. 8 is a circuit diagram showing a third structural example of the temperature correction circuit 40. The temperature correction circuit 40 of the third structural example has basically the same structure of the above second structural example (FIG. 6); however, proposes a more specific structure than the second structural example as to an internal structure of the circuit and a connection relationship with outside of the circuit (switch circuit 50 and gradation voltage generation circuit 60). Hereinafter, detailed description is performed focusing on a feature portion of the third structural example.

The temperature correction circuit 40 of the third structural example includes a reference voltage adjustment portion 44, operational amplifiers 45 to 47, resistors 48a and 48b (resistance values: Ra and Rb), and capacitors 49a and 49b besides the above resistor elements 42W and 42G and the operational amplifiers 43W and 43G.

When generating the reference voltage V0 from an input voltage Vref, the reference voltage adjustment portion 44 performs fine adjustment of the reference voltage V0 in accordance with a register value. By employing such a structure, it becomes possible to solve the production unevenness of the resistors 42W and 42G. In the meantime, as a method of the fine adjustment, it is possible to use laser trimming and the like.

A non-inverting input terminal (+) of the operational amplifier 45 is connected to an output terminal (output terminal for the reference voltage V0) of the reference voltage adjustment portion 44. An inverting input terminal (−) of the operational amplifier 45 is connected to an output terminal of the operational amplifier 45. In other words, the operational amplifier 45 functions as a buffer amplifier that conducts the reference voltage V0 to a post-stage.

A non-inverting input terminal (+) of the operational amplifier 46 is connected to the output terminal (output terminal for the grey level GL) of the operational amplifier 43G. An inverting input terminal (−) of the operational amplifier 46 is connected to the output terminal (output terminal for the white level WL) of the operational amplifier 43W via the resistor 48a, and also connected to an output terminal (output terminal for the black level BL) of the operational amplifier 46 via the resistor 48b. In other words, the operational amplifier 46 functions as a black level generation portion that generates the black level BL from the white level WL and grey level GL by means of the above calculation formula (BL=(GL−WL)×α+WL). It is possible to arbitrarily set the above gain α (=(Ra+Rb)/Ra) by adjusting the resistance value Rb. In the meantime, the output smoothing capacitor 49a is connected to the output terminal of the operational amplifier 46 via a pad.

A non-inverting input terminal (+) of the operational amplifier 47 is connected to the output terminal (output terminal for the white level WL) of the operational amplifier 43W. An inverting input terminal (−) of the operational amplifier 47 is connected to an output terminal of the operational amplifier 47. In other words, the operational amplifier 47 functions as a buffer amplifier that conducts the white level WL to the gradation voltage generation circuit 60 on the post-stage. In the meantime, the output smoothing capacitor 49b is connected to the output terminal of the operational amplifier 47 via a pad.

The switch circuit 50 switches, in a stepwise manner (e.g., 6 steps), the number of dummy pixel circuits that are connected to the operational amplifiers 43W and 43G, respectively. As the number of dummy pixel circuits connected respectively to the operational amplifiers 43W and 43G increases, an electric current flowing in one dummy pixel circuit becomes smaller; accordingly, the white level WL and the grey level GL become higher, and the source voltage VS becomes higher. In other words, as the number of dummy pixel circuits connected respectively to the operational amplifiers 43W and 43G increases, the brightness of the panel portion 10 is more pulled down. By disposing such switch circuit 50, it is possible to give a brightness adjustment function of the panel portion 10 to the temperature correction circuit 40.

The gradation voltage generation circuit 60 generates a plurality of gradation voltages (e.g., 256 gradations) that range from the white level WL during the all turned-on time to the black level BL during the all turned-off time, and supplies them to the source driver 20. For example, the gradation voltage generation circuit 60 includes a resistor ladder that is connected in series between an application terminal for the black level BL and an application terminal for the white level WL, and generates the plurality of gradation voltages by dividing the voltage across the resistor ladder by means of the resistor. The source driver 20 selects any one of the plurality of gradation voltages input from the gradation voltage generation circuit 60 and outputs the selected one as the source voltage VS to the pixel circuit 11 of the panel portion 10.

Figure 9:
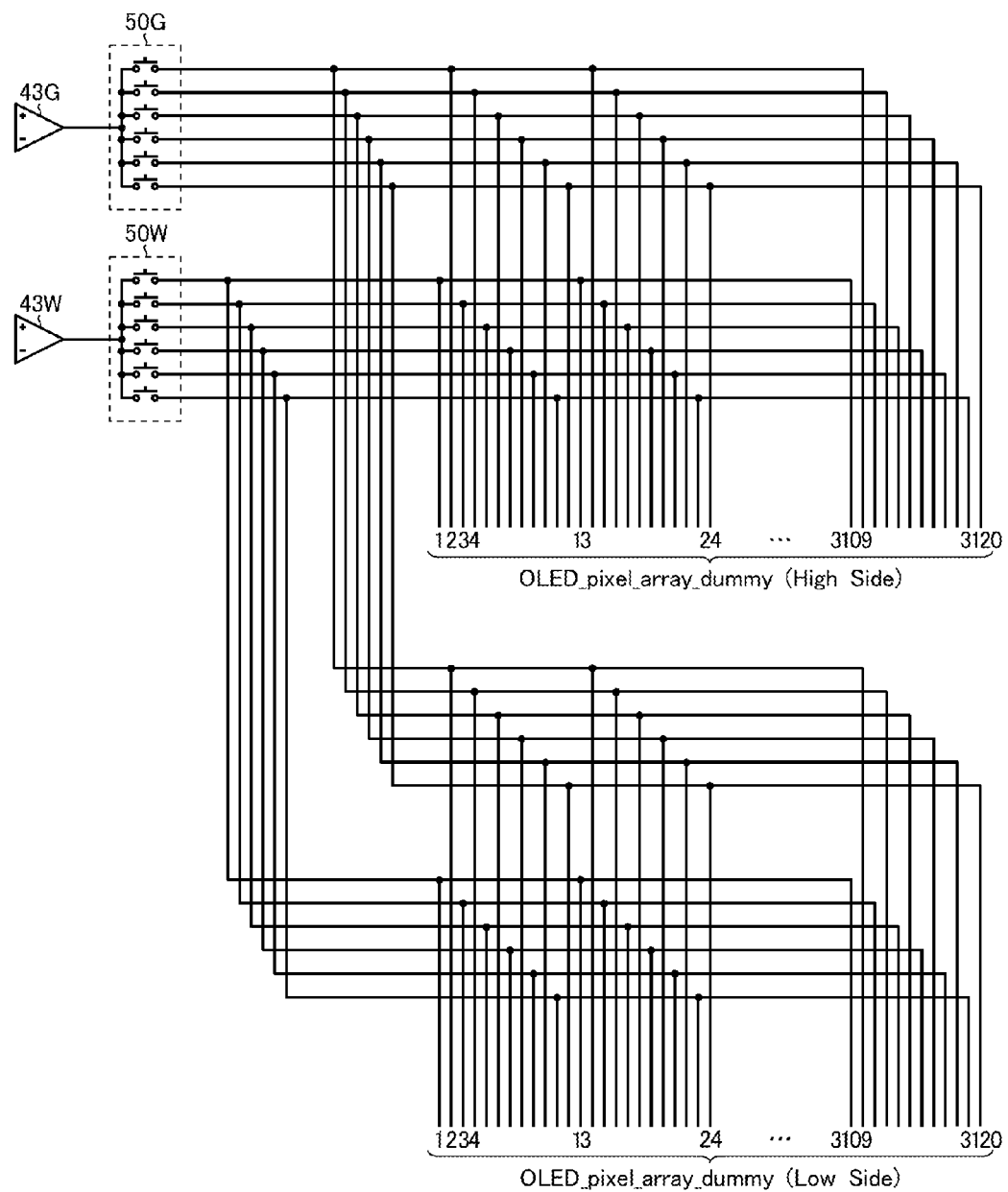
FIG. 9 is a schematic view showing a wiring example that extends to a dummy pixel circuit.

FIG. 9 is a schematic view showing a wiring example that extends to the dummy pixel circuit. As shown in FIG. 9, a set of high-side dummy pixel circuits and a set of low-side dummy pixel circuits, the respective numbers of which are the same as each other, are equally connected to the operational amplifier 43W via a switch circuit 50W. Besides, a set of high-side dummy pixel circuits and a set of low-side dummy pixel circuits, the respective numbers of which are the same as each other, are equally connected to the operational amplifier 43G via a switch circuit 50G. Hereinafter, a specific example is described in detail.

A total of 3120 (=260×12=1040 lateral×vertical×3 colors) high-side dummy pixel circuits are disposed on the high side of a pixel array (1040 lateral×784 vertical×3 colors). Half of these high-side dummy pixel circuits, that is, a total of 1560 high-side dummy pixel circuits are connected to the operational amplifier 43W via the switch circuit 50W, while the remaining 1560 high-side dummy pixel circuits are connected to the operational amplifier 43G via the switch circuit 50G. The 1560 high-side dummy pixel circuits connected to the operational amplifier 43W are divided in 6 groups each of which includes 260 dummy pixel circuits, and connection/disconnection to and from the operational amplifier 43W is switched for each group. Likewise, the 1560 dummy pixel circuits connected to the operational amplifier 43G also are divided in 6 groups each of which includes 260 dummy pixel circuits, and connection/disconnection to and from the operational amplifier 43G is switched for each group.

On the other hand, also a total of 3120 (=260×12) low-side dummy pixel circuits are disposed on the low side of the pixel array. Half of these low-side dummy pixel circuits, that is, a total of 1560 low-side dummy pixel circuits are connected to the operational amplifier 43W via the switch circuit 50W, while the remaining 1560 low-side dummy pixel circuits are connected to the operational amplifier 43G via the switch circuit 50G. The 1560 low-side dummy pixel circuits connected to the operational amplifier 43W are divided in 6 groups each of which includes 260 dummy pixel circuits, and connection/disconnection to and from the operational amplifier 43W is switched for each group. Likewise, the 1560 dummy pixel circuits connected to the operational amplifier 43G also are divided in 6 groups each of which includes 260 dummy pixel circuits, and connection/disconnection to and from the operational amplifier 43G is switched for each group.

For example, in a case where only the first group is selected by the switch circuits 50W and 50G, 260 high-side dummy pixel circuits and 260 low-side dummy pixel circuits are equally connected to the operational amplifiers 43W, and 43G, respectively. By employing such a structure, it becomes possible to average the production unevenness of the high-side dummy pixel circuits and low-side dummy pixel circuits.

Besides, looking at the lateral arrangement of the high-side dummy pixel circuits and low-side dummy pixel circuits, the odd-numbered dummy pixel circuits are connected to the operational amplifier 43W, while the even-numbered dummy pixel circuits are connected to the operational amplifier 43G. In other words, the dummy pixel circuits connected to the operational amplifier 43W and the dummy pixel circuits connected to the operational amplifier 43G are alternately disposed. By employing such a structure, it is also possible to average the production unevenness in the lateral direction.

In the meantime, as shown in FIG. 8 described above, in the case where the high-side dummy pixel circuits and the low-side dummy pixel circuits are disposed in every multiple rows, it is desirable that the temperature correction circuit 40 uses dummy pixel circuits located on a central portion of the panel as long as it is possible.

<Application to Electronic Apparatus>

Figure 10:
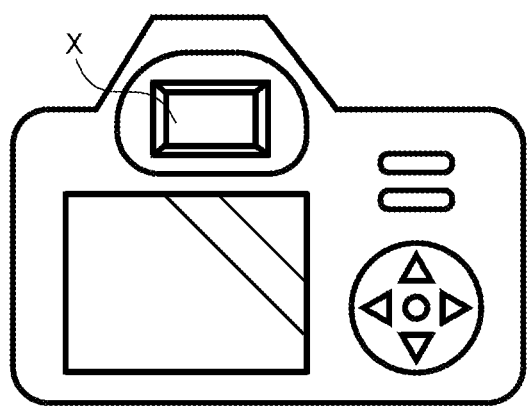
FIG. 10 is an appearance view of an electronic view finder.
Figure 11:
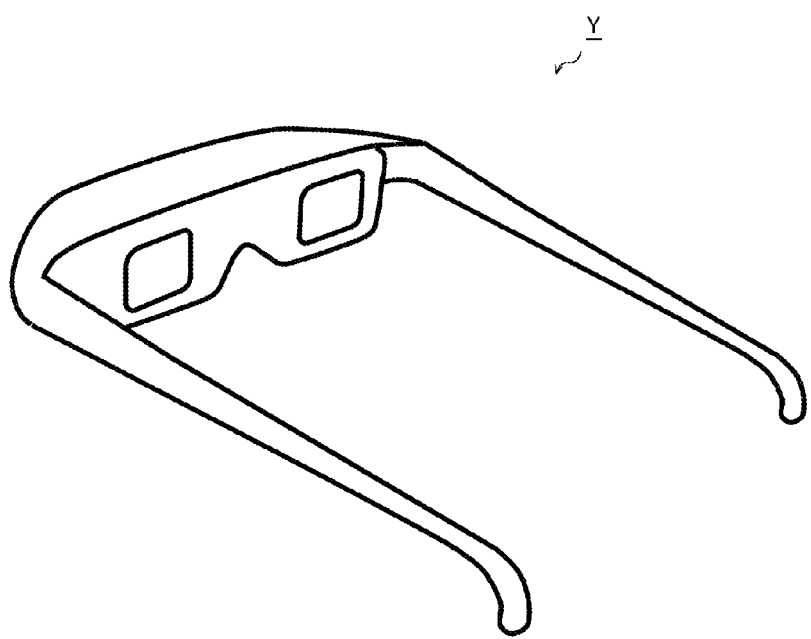
FIG. 11 is an appearance view of a head-mounted display.

The organic EL display 1 described above is preferably usable, for example, for an electronic view finder X (FIG. 10) and an image display device (organic EL micro-display) of a head-mounted display Y (FIG. 11).

<Other Modifications>

In the meantime, in the above embodiments, the organic EL display is described as an example; however, the application target of the present invention is not limited to this, but the same method is applicable when correcting the brightness of an organic EL light in accordance with a temperature.

As described above, the various technical features disclosed in the present specification are able to be modified without departing from the spirit of the technical creation besides the above embodiments. In other words, it should be considered that the above embodiments are examples in all respects and are not limiting, and it should be understood that the technical scope of the present invention is not indicated by the above description of the embodiments but by the claims, and all modifications within the scope of the claims and the meaning equivalent to the claims are covered.

What is claimed is:

1. An organic EL device comprising:
   an organic EL element;
   a first transistor that controls a drive current of the organic EL element in accordance with a brightness adjustment voltage; and
   a temperature correction circuit that corrects the brightness adjustment voltage in accordance with a temperature;
   wherein
   the temperature correction circuit includes:
   a second transistor that has a same temperature characteristic as the first transistor;
   a resistor element that is connected to the second transistor; and
   an operational amplifier that controls the second transistor such that a predetermined reference voltage and a voltage across the resistor element become equal to each other;
   wherein the temperature correction circuit corrects the brightness adjustment voltage in accordance with an output from the operational amplifier.

2. The organic EL device according to claim 1, further comprising:
   a panel portion that is composed of a plurality of pixel circuits arranged in an array, and
   a source driver that outputs a source voltage to the panel portion, wherein the plurality of pixel circuits each include the organic EL element and the first transistor and receive an input of the source voltage as the brightness adjustment voltage.

3. The organic EL device according to claim 2, wherein
the panel portion includes a plurality of dummy pixel circuits formed in a same pattern as the plurality of pixel circuits to surround the plurality of pixel circuits, and
at least one of the plurality of dummy pixel circuits is connected to the resistor element and the operational amplifier, and a transistor included in the dummy pixel circuit is used as the second transistor.

4. The organic EL device according to claim 3, wherein
both a high-side dummy pixel circuit and a low-side dummy pixel circuit are equally connected to the operational amplifier.

5. The organic EL device according to claim 4, further comprising a gradation voltage generation circuit that generates a plurality of gradation voltages that range from a white level during an all turned-on time to a black level during an all turned-off time, wherein
the source driver selects any one of the plurality of gradation voltages as the source voltage.

6. The organic EL device according to claim 5, wherein
the temperature correction circuit uses two sets of the resistor element and the operational amplifier to decide the white level and a grey level during a half turned-on time, further decides the black level from the white level and the grey level.

7. The organic EL device according to claim 6, wherein
a dummy pixel circuit connected to an operational amplifier for deciding the white level and a dummy pixel circuit connecting to an operational amplifier for deciding the grey level are disposed alternately.

8. The organic EL device according to claim 1, further comprising a switch circuit that switches a number of the dummy pixel circuits connected to the operational amplifier.

9. The organic EL device according to claim 1, wherein
the temperature correction circuit includes a reference voltage adjustment portion that finely adjusts the reference voltage in accordance with a register value.

10. An electronic apparatus comprising the organic EL device according to claim 1.

* * * * *